United States Patent [19]
Ohkoshi et al.

[11] Patent Number: 4,586,860
[45] Date of Patent: May 6, 1986

[54] SPINDLE HEAD FOR A MACHINE TOOL

[75] Inventors: Fumihiko Ohkoshi, Anjoh; Toshifumi Hasegawa, Ohbu; Norikazu Kanii, Chita, all of Japan

[73] Assignee: Toyoda Koki Kabushiki Kaisha, Kariya, Japan

[21] Appl. No.: 529,630

[22] Filed: Sep. 6, 1983

[30] Foreign Application Priority Data

Jun. 9, 1982 [JP] Japan .............................. 57-135121[U]

[51] Int. Cl.$^4$ .......................... B23B 31/04; B23C 5/26
[52] U.S. Cl. .................................... 409/233; 408/239 R
[58] Field of Search ............... 409/233, 232, 231, 234; 408/239 R, 239 A; 279/4 R

[56] References Cited

U.S. PATENT DOCUMENTS 3,490,333 1/1970 Scruton .............................. 409/233
3,520,228 7/1970 Wohlteil ............................ 409/233

FOREIGN PATENT DOCUMENTS 56-7375 2/1981 Japan .

Primary Examiner—Z. R. Bilinsky
Attorney, Agent, or Firm—Oblon, Fisher, Spivak, McClelland & Maier

[57] ABSTRACT

A spindle head for a machine tool rotatably carries a tool spindle, which is drivingly connected with an output shaft of a drive motor provided in axial alignment therewith. A drawing bar received in an axial through hole of the tool spindle is urged by means of springs for clamping on the tool spindle a tool being inserted into a front tapered bore of the tool spindle. In order to move the drawing bar against the springs and thereby to unclamp the tool from the tool spindle, an annular cylinder device is provided around the tool spindle. This cylinder device, when supplied with pressurized fluid, moves first and second operating members toward and away from each other in the axial direction of the tool spindle. The first operating member is abuttable with a first abutting member fixed on the tool spindle, while the second operating member is abuttable with a second abutting member, which is secured to the drawing bar, with opposite end portions thereof extending externally of the tool spindle through elongate holes formed in the tool spindle. Accordingly, movement of the first and second operating members toward each other causes the second abutting member and the drawing bar to move against the springs without applying substantial thrust force to the tool spindle.

6 Claims, 2 Drawing Figures

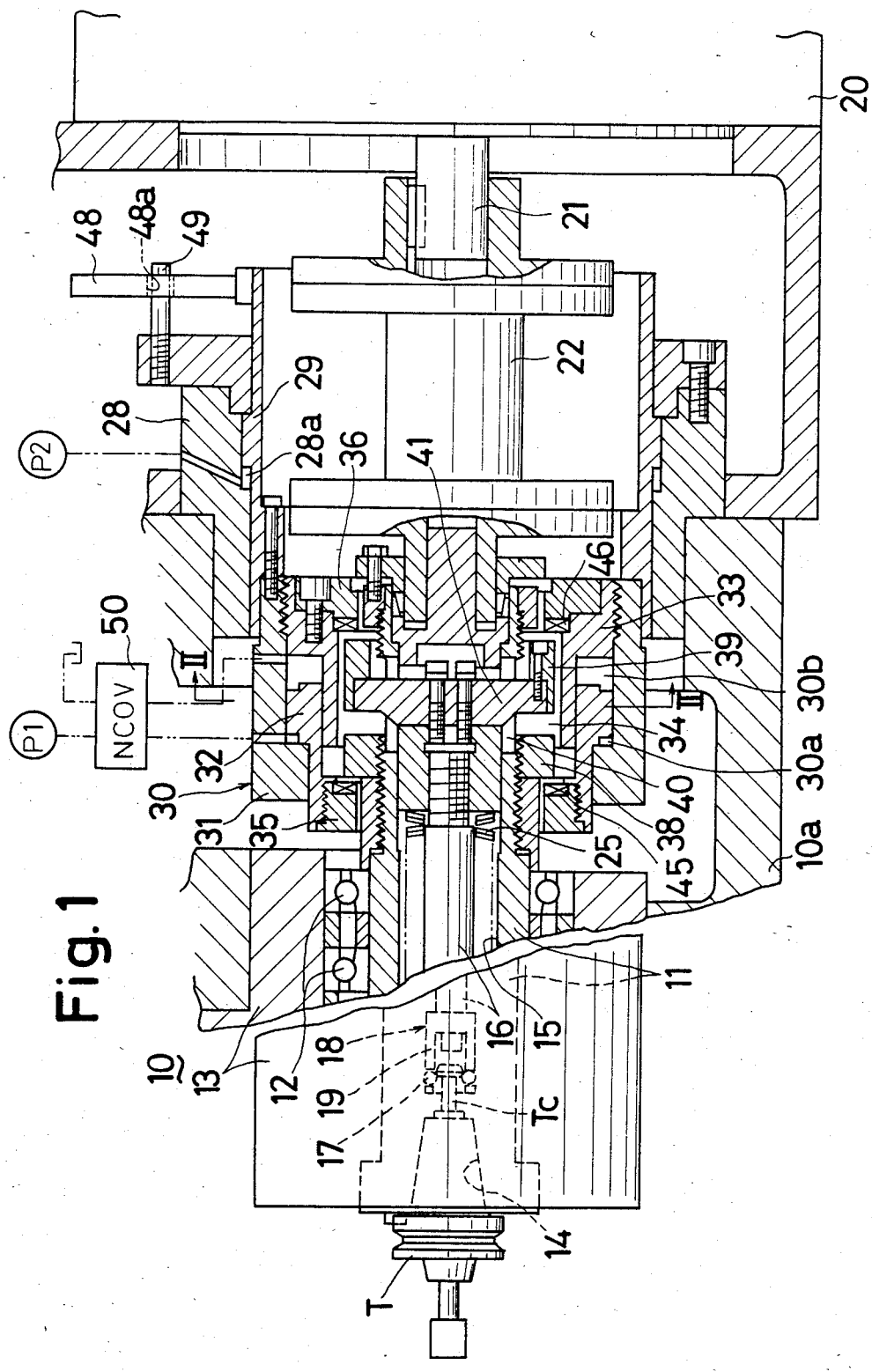

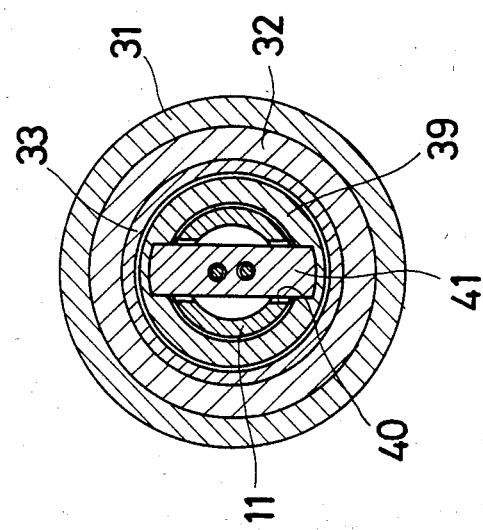

SPINDLE HEAD FOR A MACHINE TOOL

BACKGROUND OF THE INVENTION

1. Field of the Invention

The present invention relates in general to a spindle head for a machine tool and more particularly, to a spindle head capable of axially moving a drawing bar in a tool spindle against springs for unclamping from the tool spindle a tool being inserted in a receiving bore formed at a front end of the tool spindle.

2. Description of the Prior Art

Generally, in one method of rotationally driving a tool spindle, a drive motor may be directly connected to the tool spindle. This method is advantageous in that it is possible to diminish the size of a spindle head rotatably carrying a tool spindle, because the method does not need to use certain accessories such as a gear train. However, spindle heads for machining centers must be provided with a hydraulic cylinder device for axially moving against the springs of a drawing bar received in a tool spindle. Such cylinder device is conventionally disposed at the rear side of the tool spindle. Accordingly, the space for installation of a drive motor is not available at the rear side of the tool spindle, and this makes it very difficult to apply the above-noted drive method to the spindle heads for machining centers.

Further, there has been proposed a machine tool spindle head in which a cylinder device for axially moving a drawing bar is disposed at a lateral side of a tool spindle so as to secure the space for installation of a drive motor directly connected to the tool spindle. However, such arrangement may unavoidably result in enlarging the size of the spindle head if an attempt were made to incorporate the cylinder device in the spindle head. Such arrangement also makes the spindle head complicated in construction due to the necessity of a mechanism for transmitting power from the cylinder device to a drawing bar operating mechanism provided in the tool spindle.

In addition, the drawing bar operating mechanism exerts a pushing force only upon the drawing bar when operated for unclamping a tool from the tool spindle. This results in overloading of the bearings rotatably supporting the tool spindle, whereby the rotational accuracy of the bearings is deteriorated.

SUMMARY OF THE INVENTION

Accordingly, it is a primary object of the present invention to provide an improved spindle head for a machine tool which permits not only the direct drive of a tool spindle by a drive motor, but also incorporation of a drawing bar actuation cylinder device in a frame of the spindle head without substantial enlargement of the frame in dimension.

Another object of the present invention is to provide an improved spindle head for a machine tool of the character set forth above, wherein the thrust force applied to a drawing bar for unclamping a tool from a tool spindle is prevented from being exerted on bearings rotatably supporting the tool spindle.

Briefly, in a spindle head for a machine tool according to the present invention, a drive motor is mounted on a head frame, with an output shaft thereof being in axial alignment with a tool spindle and being connected with a rear end portion of the tool spindle. The tool spindle has received therein a drawing bar movable in an axial direction of the tool spindle and incorporates therein a spring which urges the drawing bar to clamp on the tool spindle a tool being inserted into a receiving bore formed at a front end portion of the tool spindle. An annular cylinder device is provided around the tool spindle for permitting the tool spindle to pass therethrough. The annular cylinder device, when supplied with pressurized fluid, moves first and second operating members toward and away from each other in the axial direction of the tool spindle. The first operating member is abuttable with a first abutting member fixed on the tool spindle, while the second operating member is abuttable with a second abutting member secured to the drawing bar and extending from opposite end portions thereof externally of the tool spindle through elongate holes formed on the tool spindle. Accordingly, the second abutting member is moved by the second operating member relative to the tool spindle, whereby the drawing bar is moved against the spring.

With this configuration, since the cylinder device is formed at its central portion with a through bore, it is possible to directly connect the tool spindle with the drive motor through the through bore. Further, the cylinder device is annular so as to occupy only a relatively small space, and this makes it possible to incorporate the cylinder device in the frame of the spindle head without substantially enlarging the dimension of the frame. In addition, power from the cylinder device can be transmitted to the drawing bar through a simple machanism.

Moreover, the thrust force applied from the second operating member to the drawing bar through the second abutting member is effectively cancelled within the tool spindle because the abutting engagement simultaneously occurs between the first operating member and the first abutting member. This prevents such thrust force from being exerted upon bearings rotatably carrying the tool spindle, whereby a desired rotational accuracy of the bearings can be maintained for a long period of time.

BRIEF DESCRIPTION OF THE DRAWINGS

The foregoing and other objects and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which:

FIG. 1 is a longitudinal sectional view of a spindle head for a machine tool according to the present invention; and FIG. 2 is a sectional view of the spindle head taken along the line II—II of FIG. 1.

DETAILED DESCRIPTION OF A PREFERRED EMBODIMENT

Referring now to the drawings and particularly to FIG. 1 thereof, there is shown a spindle head 10 for a machining center having a frame 10a to which a bearing sleeve 13 is secured. The sleeve 13 rotatably carries a tool spindle 11 therein through bearings 12. The spindle 11 is integrally connected at its rear end with an output shaft 21 of a drive motor 20 through a coupling 22 and is formed at its front end with a tapered bore 14 for receiving a tool T therein.

The tool spindle 11 is formed with an axial through hole 15, in which provided are a drawing bar 16 and a set of washer springs 25 for rearwardly urging the drawing bar 16. The drawing bar 16 is provided at its front end with a tool arresting head 18 which includes, for example, an annular member 19 and a number of steel balls 17 held in the annular member 19 for radial movement, as is well known in the art. When the drawing bar 16 is rearwardly moved against the springs 25, the steel balls 17 are radially inwardly moved along a cam surface (not shown) to thereby arrest a pulling stud Tc of the tool T.

The spindle head frame 10a fixedly mounts a guide cylinder 28 at the rear side of and is in axial alignment with the tool spindle 11. The sliding piston 29 is received in the cylinder 28 for sliding movement in an axial direction of the tool spindle 11. This sliding piston 29 is cylindrical and has secured to its front end a tool unclamping cylinder device 30 which comprises a cylinder 31, a piston 32 and an end cap 33. The cylinder 31, piston 32 and end cap 33 are cylindrical or annular to define at their central portions a through bore 34, through which the rear end portion of the tool spindle 11 passes. The piston 32 has secured to its front end a first annular operating member 35 which faces a first abutting member 38 threadedly fixed on the tool spindle 11. The end cap 33 has secured to its rear end a second annular operating member 36 which faces a second abutting member 39. This second abutting member 39 is secured to opposite ends of a radial extension 41, as best shown in FIG. 2. The radial extension 41 is secured to the drawing bar 16, with opposite ends thereof radially protruding beyond the external surface of the tool spindle 11 through elongate holes 40 formed in the tool spindle 11.

The first and second operating members 35 and 36 support needle bearings 45 and 46 at inner end surfaces thereof, respectively. These needle bearings permit the first and second abutting members 38 and 39 to rotate while the same are in contact, respectively, with the first and second operating members 35 and 36. Accordingly, it is possible to clamp the tool T onto, and to unclamp it from the tool spindle 11 even when the same is rotating. Further, a pin 49 rearwardly extends from the rear end surface of the guide cylinder 28. This pin 49 is engaged with a hole 48a of a plate 48 secured to the sliding piston 29 to work against rotation of the sliding piston 29.

The operation of the apparatus as described above will be described hereinbelow. FIG. 1 shows a state wherein the drawing bar 16 has been rearwardly drawn by the force of the springs 25, with the arresting head 18 clamping the tool T being received in the tapered bore 14 of the tool spindle 11. In this state, the sliding piston 29 and the tool clamping cylinder 30 integrally connected thereto are at a rearward end position because low-pressurized fluid is continuously supplied from a low-pressurized fluid supply P2 into a front chamber 28a of the guide cylinder 28. Consequently, clearances in the axial direction are maintained between the first operation member 35 and the first abutting member 38 and between the second operating member 36 and the second abutting member 39, so that no contact takes place therebetween during rotation of the tool spindle 11.

In order to unclamp the tool T being received in the tapered bore 14, first a magnetic change-over valve 50 is switched to supply pressurized fluid from a high-pressurized fluid supply P1 into a front chamber 30a of the tool unclamping cylinder 30. The piston 32 is thus retracted to bring the first operating member 35 into abutting engagement with the first abutting member 38. This abutting engagement discontinues the retraction movement of the piston 32 relative to the tool spindle 11, which, however, counteracts so as to advance the cylinder 31, the end cap 33 and the second operating member 36 relative to the tool spindle 11. Because the advance movement of the cylinder 31 relative to the piston 32 is further continued, the second operating member 36 is brought into abutting engagement with the second abutting member 39 and advances the drawing bar 16 against the force of the springs 25. Consequently, the pulling stud Tc of the tool T is no longer arrested by the steel balls 17 on, in other words, the tool T is unclamped from the tool spindle 11 so as to make itself ready for tool exchange operation.

During unclamping movement, although the thrust force from the second operating member 36 acts on the tool spindle 11 through the second abutting member 39, the radial extension 41, the drawing bar 16 and the washer springs 25, such thrust force is cancelled by the first abutting member 38 abutting with the first operating member 35. Accordingly, no thrust overload is applied to the bearings 12 and the bearing sleeve 13 which supports the tool spindle 11. This avoids damage to the bearings 12 and the sleeve 13, whereby high rotational accuracy of the tool spindle 11 can be maintained for a long period of time.

After the used tool T is removed from the tapered bore 14 and a new tool T is inserted therein, the change-over valve 50 is switched back to supply pressurized fluid into a rear chamber 30b of the tool unclamping cylinder device 30. The piston 32 is thus forwardly moved to disengage the first operating member 35 from the first abutting member 38, during which time the sliding piston 29 and the cylinder 31 integral therewith are rearwardly moved to disengage the second operating member 36 from the second abutting member 39, because low-pressurized fluid is continuously supplied into the front chamber 28a of the guide cylinder 28.

Such movements of the piston 32 and the cylinder 31 permit the drawing bar 16 to be rearwardly moved by the force of the springs 25. The tool arresting head 18 thus arrests the new tool T by engaging the steel balls 17 with the pulling stud Tc of the new tool T, whereby the clamping and unclamping operation of the tools T are completed.

Obviously, numerous modifications and variations of the present invention are possible in light of the foregoing teachings. It is therefore to be understood that within the scope of the appended claims, the present invention may be practiced otherwise than as specifically described herein.

What is claimed as new and desired to be secured by Letters Patent of the United States is:

1. A spindle head for a machine tool, comprising:
   a head frame;
   a tool spindle rotatably carried in said head frame through bearings and formed with a tool receiving bore at a front end thereof and a plurality of elongate holes;
   a drive motor mounted on said head frame, with an output shaft thereof being in axial alignment with said tool spindle;

means for drivingly connecting said output shaft of said drive motor with a rear end portion of said tool spindle;

a drawing bar axially movable in said tool spindle for clamping a tool received in said tool receiving bore on said tool spindle and unclamping said tool from said tool spindle;

spring means provided in said tool spindle for urging said drawing bar to move in a first axial direction;

a first annular hydraulic cylinder device formed around said tool spindle for permitting said tool spindle to pass therethrough;

a first operating member movable by said hydraulic cylinder device in an axial direction of said tool spindle when said hydraulic cylinder device is operated for unclamping the tool from the tool spindle;

a first abutting member fixed to said tool spindle and abuttable with said first operating member for cancelling a thrust force acting on said tool spindle when said drawing bar is moved against the force of said spring means;

a second operating member movable by said hydraulic cylinder device relative to said first operating member in the axial direction of said tool spindle when said hydraulic cylinder device is operated for unclamping said tool from said tool spindle; and a second abutting member secured to said drawing bar and protruding from opposite ends thereof externally of said tool spindle through said elongate holes formed in the tool spindle so as to be engaged with, and to be moved by said second operating member against the force of said spring means.

2. A spindle head as set forth in claim 1, wherein said hydraulic cylinder device is movable in the axial direction of said tool spindle, further comprising:

urging means for urging said hydraulic cylinder device to move axially toward such a position as to normally prevent contact between said first operating member and said first abutting member and between said second operating member and said second abutting member.

3. A spindle head as set forth in claim 2, wherein said urging means further comprises:

a second annular hydraulic cylinder device provided between said head frame and said hydraulic cylinder device for supporting said hydraulic cylinder device to be movable relative to said head frame in the axial direction of said tool spindle and which includes a fluid chamber; and low-pressurized fluid supply means for continuously supplying low-pressurized fluid into said fluid chamber formed in said second annular hydraulic cylinder device.

4. A spindle head as set forth in claim 2, further comprising:

first and second thrust bearings respectively provided between said first operating member and said first abutting member and between said second operating member and said second abutting member.

5. A spindle head as set forth in claim 4, wherein:

said first and second abutting members are located between said first and second operating members in the axial direction of said tool spindle.

6. A spindle head as set forth in claim 5, further comprising:

means for preventing rotation of said first annular hydraulic cylinder device, while permitting axial sliding movement of said first annular hydraulic cylinder device.

* * * * *